F. P. McINTOSH & E. F. BEAUBIEN.
SIGNALING SYSTEM.
APPLICATION FILED NOV. 4, 1910.
1,195,600.
Patented Aug. 22, 1916.
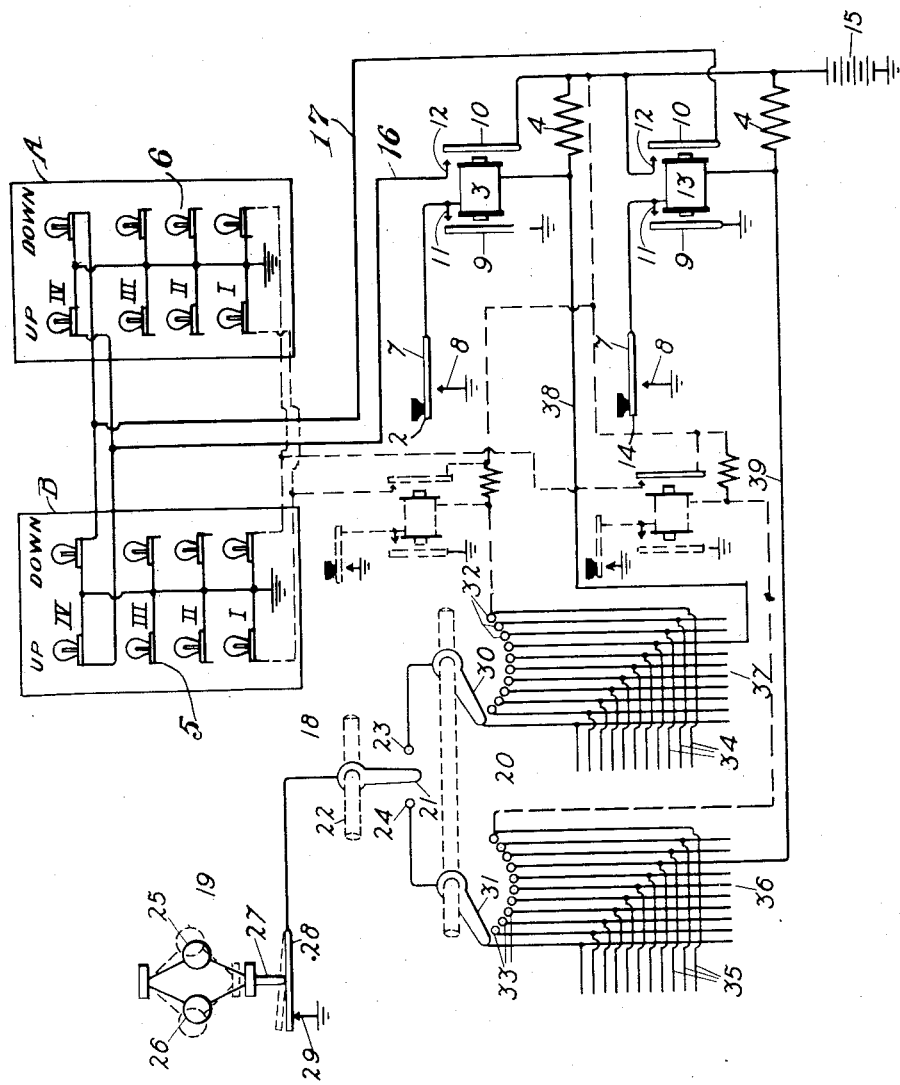
Witnesses
F. J. Woodward
G. M. Campbell
Inventors:
Frederick P. McIntosh
Edgar F Beaubien
by D. C. Tanner, Att'y.

UNITED STATES PATENT OFFICE.

FREDERICK P. McINTOSH, OF NEW YORK, N. Y., AND EDGAR F. BEAUBIEN, OF WILMETTE, ILLINOIS, ASSIGNORS, BY MESNE ASSIGNMENTS, TO WESTERN ELECTRIC COMPANY, INCORPORATED, A CORPORATION OF NEW YORK.

SIGNALING SYSTEM.

1,195,600.  Specification of Letters Patent.  Patented Aug. 22, 1916.

Application filed November 4, 1910. Serial No. 590,679.

*To all whom it may concern:*

Be it known that we, FREDERICK P. McINTOSH, a subject of the King of England, residing at New York, in the county of New York and State of New York, and EDGAR F. BEAUBIEN, a citizen of the United States, residing at Wilmette, in the county of Cook and State of Illinois, have invented a certain new and useful Improvement in Signaling Systems, of which the following is a full, clear, concise, and exact description.

This invention relates to annunciator or signaling systems for movable cars in which means are provided whereby the operator of a car may be signaled to stop at a particular station.

The object of this invention resides in the provision of an improved system and apparatus whereby the operator of a car may be signaled to stop at any station from said station, and whereby stopping the car at such station will restore or cancel the signal individual thereto.

This invention is especially designed for use in connection with elevator systems and the embodiment herein disclosed involves the provision of a key on the respective floors, which key when actuated will cause the display of a signal corresponding to that floor in the car or cars, and the further provision of means whereby the signal will be automatically effaced by the stopping of a car at the floor from which the signal was sent. Independent signals may be and are preferably provided to indicate the direction in which the passenger desires to go, with different keys for actuating these signals. The restoring mechanism, controlled by the direction of movement of the elevators, is however arranged to control the restoration of the signals in the cars, so that the signals once actuated will remain set until a car going in the proper direction has stopped at the floor, the restoration of the signals by the stopping of a car being dependent upon the direction in which the car is going. For instance, a passenger at a certain floor desiring to go down, presses a "down" button, which brings about the display of "down" signals individual to that floor in all of the cars. These signals will be unaffected by an upgoing car which may stop at that floor or by the stopping of a downgoing car at any other floor, and will be effaced only by a downgoing car stopping at the floor designated by the signal.

In one embodiment of this invention a master switch is provided in connection with each car and controlled by the movement of the car, which master switch operates in connection with a directional switch to efface the signal at any particular floor only by the stopping of a car at that floor going in the direction designated by the signal, the signal being unaffected by a car traveling in the opposite direction to that designated by the signal or by a car going in the same direction as indicated by the signal and not stopping at the floor designated. One arrangement by means of which this may be accomplished is shown in the accompanying drawing and consists in providing in connection with the operating mechanism of the car a master switch which will be opened by the movement of the car and will remain open during the time the car is in motion but will be closed when the car is stopped.

The accompanying drawing is a diagram of the circuits and apparatus we propose for an elevator signaling system.

The signaling mechanism herein shown comprises an indicator or annunciator A, a circuit closing device or key 2, an electromagnetic switch or relay 3 and a resistance 4. A single key and relay is required for each indicator circuit but duplicate indicators B may be located in all the other cars that will respond to a particular key.

It is preferred to use incandescent lamps for annunciators and a group of lamps 6 is shown for one car and a duplicate group 5 for additional cars.

Each group of lamps may be composed of two classes arranged in two vertical rows designated respectively as up and down signals. The lamps in the right hand row indicating "down" and those in the left hand row indicating "up". There may be a lamp for each station in each of these rows.

The key 2 may be of any suitable construction but as shown each consists of a spring member 7 normally out of engagement with a contact point 8 with which it is adapted to make contact when operated to complete an electric circuit. The spring may be provided with an insulating stud to be pressed by a person desiring to signal a car. These keys are preferably located at the various stations at which the cars will stop and a separate key may be provided for each station for causing the display of the signal corresponding to that station and in the group corresponding to the direction in which the passenger wishes to travel. For an elevator system, "up" and "down" keys would be provided at each floor for controlling the circuits of the corresponding indicators in the cars. The top floor of course need only have a "down" key and the ground floor only an "up" key.

The relays 3 and 13 as shown are so constructed that when excited the armatures 9 and 10 will make connection with their front contacts 11 and 12 respectively.

The relays 3 and 13 are included in circuits completed by their associated keys 2 and 14 respectively from grounded source of energy 15, through resistance 4, relay winding, contacts 7 and 8 of the particular key operated, and ground.

When a relay is once operated, a circuit is established from ground, through contacts 9 and 11, through the winding of the relay, resistance 4, to the grounded source of energy. The relay is then held in its operated position until released as will hereinafter be described.

As hereinbefore stated a relay is associated with each key so that there will be "up" and "down" relays if "up" and "down" keys are used. Each of the "up" relays 3 controls a circuit 16 from the grounded source of energy 15, through contacts 10, and 12, and indicators IV in the "up" row in the cars, to ground. These indicators correspond to the station with which the key 2 and the relay 3 are associated. Similarly each of the "down" relays 13 controls circuits 17 for the corresponding indicator IV in "down" rows in the cars.

The relays may be located with the keys at the various floors or stations or they may be arranged in a group and located in some suitable place where they will be easy to inspect and maintain.

The resistances 4 are more particularly related to the mechanism for releasing the relays 3 and 13 as will hereinafter be described but they are referred to here for the reason that they are shown connected in circuit with the relays.

The mechanism herein shown for restoring the signals comprises a directional switch 18, a master switch 19 and a commutating device 20, there being one each of these devices provided for each car.

The directional switch for each car is preferably arranged so that when a car is traveling in one direction the switch is in position to control the circuits for the signals designating that direction, but as soon as the car stops and moves in another direction the switch will be automatically shifted to a position where it can control the circuit for the signals designating the direction in which the car is then traveling. In the switch shown on the drawings a switch blade 21 is mounted frictionally upon the shaft 22 and is adapted to engage alternatively either the contact 23 or the contact 24. When the shaft 22 is rotating in one direction, the switch blade 21 is swung into engagement with contact 23 and remains in engagement with said contact as the shaft continues to rotate in the same direction, the shaft to be adapted in any well known manner to slip relatively to the switch blade. When the direction of rotation of the shaft 22 is reversed, however, the switch blade 21 is withdrawn from the contact 23 and thrown over into engagement with the contact 24, where it remains until thrown back again by a reverse rotation of the shaft 22. An alternatively-acting direction switch is thus provided, controlled by the movement of the car, so that when the car is going in one direction the contact pieces 21 and 23 will be in engagement, but when the car is going in the opposite direction that contact will be broken and the contacts 21 and 24 established.

The master switch may be of any suitable form wherein an operating member is controlled by the movement of a car. The switch shown at 19 is arranged in the form of a fly-ball governor, having weights or balls 25, 26, carried by a shaft 27 and arranged to move outwardly as the shaft revolves so as to cause the end of the shaft to change its position and allow the contact spring 28 to break connection with the resting contact anvil 29. In this illustration of our invention the switch is associated with the operating mechanism of the car in such a way that so long as the car is moving the contacts 28 and 29 will be open.

The commutating device shown at 20 embodies two arms 30 and 31 each adapted to pass over a series of contacts 32 and 33 respectively. The commutator device for each car is arranged to be operated by the actuating mechanism of the car with which it is associated and the arms 30 and 31 pass over the contacts 33 and 32 successively according to the direction of movement of the car. These commutators may be located in any convenient place. Each commutating device is provided with an equal number of contacts which correspond to the number of indicators to be controlled and in a system where the indicators are multiplied in a number of cars the corresponding contacts of the several commutating devices are multiplied together by means of wires 34 and 35.

Individual wires 36 and 37 lead from the contacts 33 and 32 to the various relays 3 and 13 corresponding to the individual floors. In the drawing one set of relays is shown in full lines for the fourth floor signals. A duplicate set of relays operating in the same manner and under the same conditions is shown in dotted lines for the first floor signals; and it is to be understood that additional duplicate sets of relays connected in the same manner and operating in the same way would be used for the other floors at which the car or cars were to stop. The switch arms 30 and 31 of the commutating device are shown connected to the contacts 23 and 24 respectively of the directional switch 18.

The signal restoring mechanisms are not at all times capable of controlling the several indicator circuits but by the action of the commutating devices which are operated by mechanical connection with the actuating devices of the cars the said restoring mechanisms will be capable of positively controlling the indicator circuits only when a car has reached the corresponding station.

The operation of the system is as follows: Suppose a person at an intermediate station desires to go up, he presses the corresponding key 2 and closes a circuit from the grounded source of energy 15 through resistance 4, and relay 3 to ground. Relay 3 in its operation completes a circuit for the lamps IV as follows: ground, battery 15, contacts 10, 12, conductor 16, lamps IV to ground. This relay also closes a holding circuit for itself as follows: ground, battery 15, resistance 4, winding of relay 3, contacts 11, 9, to ground. Assuming that there is a car at one of the lower stations and going "up", the direction switch will be in the corresponding position and switch member 21 in contact with 23, a circuit will then be established from the contact member 28 of the master switch through 21 and 23 of the directional switch, to the contact arm 30 of the commutating device. As long as the car is in motion the master switch contact is open. When the car arrives at the station designated by the signal the commutator arm 30 will make connection with the contact point 32 and complete a circuit over wire 38 to the connecting point between relay 3 and resistance 4 and as soon as the car stops the master switch mechanism will cause a circuit to be closed from ground through contacts 29 and 28 through the direction switch, commutator, and over wire 38 to the resistance 4 and relay 3. This circuit provides a path of low resistance from 4 to ground and serves as a shunt or short circuit for the relay 3. As soon as this low resistance path or short circuit is completed the relay 3 is deënergized and armatures 9 and 10 are released. 9 in releasing opens the holding circuit for the relay. 10 opens the circuit for the signals IV restoring them to normal. Should a downgoing car stop at the station indicated by the signal, the "up" signal would not be affected because the direction switch would be in the "down" position and therefore unable to complete the short circuit over wire 38 hereinbefore described. Should a person at any station wish to go down instead of up, the operation of the system would be the same as described above except that the key 14 would be pressed and relay 13 and its associated signals IV operated. The restoring operation would be the same in this case except that the short circuit would be established through the down contacts 21 and 24 of the direction switch and contacts 31 and 33 of the commutating device over wire 39.

In the arrangement of the circuit shown and from the above description of the various elements and the operation thereof constituting the releasing mechanism, it will be apparent that the commutating device determines the time at which any indicator may be released and it follows that the commutators being so arranged as to close only the circuits for a particular indicator when the car has reached the station to which the indicator corresponds, none of the indicators when once operated can be restored to normal until a car moving in the proper direction stops at the corresponding station.

It is to be understood that we do not wish to be limited to the particular form of apparatus shown in the drawing and forming a part of this specification for the reason that different forms of apparatus could be used in carrying out our invention.

We claim:

1. The combination with a movable car, of a signal for said car, a circuit controlling said signal, electromagnetic means in said circuit for maintaining said signal, and a releasing circuit including switches associated with said car and means for closing said switches upon the stopping of said car at the point designated by said signal.

2. The combination with a movable car, of a plurality of signals therefor, holding devices for said signals, releasing means comprising circuits individual to each of said holding devices, and a switch common to said releasing circuits actuated by stopping said car.

3. The combination with a movable car, of two signals for said car, independent circuits controlling said signals, an electromagnet in each of said circuits for maintaining the associated signal, a releasing means for each electromagnet comprising a circuit, a switch common to said last mentioned circuits actuated by stopping said car, and a directional switch controlled by said car also included in said circuit whereby said releasing circuits are alternately rendered effective.

4. In combination with a movable car arranged to serve a plurality of stations, an annunciator system comprising a plurality of electrically operated signals in the car, there being a signal for each direction of travel from each station; manually controlled means for each station for actuating and maintaining the signals for that station; and means for canceling each signal comprising a circuit for each signal, and switches responsive to the location, direction of movement and stopping of the car, respectively, common to said circuits.

In witness whereof I, the said FREDERICK P. MCINTOSH, hereunto subscribe my name this 31st day of October 1910.

FREDERICK P. McINTOSH.

Witnesses:
MORGAN WASHBURN, Jr.,
IRVING MACDONALD.

In witness whereof I, the said EDGAR F. BEAUBIEN, hereunto subscribe my name this 1st day of November, 1910.

EDGAR F. BEAUBIEN.

Witnesses:
GEORGE P. BARTON,
GEORGE L. CRAGG.